(12) United States Patent
Zhu et al.

(10) Patent No.: US 8,213,419 B2
(45) Date of Patent: Jul. 3, 2012

(54) INTERWORKING NETWORK ELEMENT, INTERWORKING SYSTEM BETWEEN THE CSI TERMINAL AND THE IMS TERMINAL AND THE METHOD THEREOF

(75) Inventors: Dongming Zhu, Shenzhen (CN); Hengliang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 932 days.

(21) Appl. No.: 12/170,227

(22) Filed: Jul. 9, 2008

(65) Prior Publication Data

US 2008/0298353 A1 Dec. 4, 2008

Related U.S. Application Data

(63) Continuation of application No. PCT/CN2007/000078, filed on Jan. 9, 2007.

(30) Foreign Application Priority Data

Jan. 9, 2006 (CN) .......................... 2006 1 0023170
Apr. 26, 2006 (CN) .......................... 2006 1 0077923

(51) Int. Cl.
*H04L 12/66* (2006.01)
(52) U.S. Cl. ........................................................ 370/356
(58) Field of Classification Search .................. None
See application file for complete search history.

(56) References Cited

U.S. PATENT DOCUMENTS 6,996,087 B2 2/2006 Ejzak
7,203,163 B1 4/2007 Hundscheidt et al.

(Continued)

FOREIGN PATENT DOCUMENTS

CN 1370368 A 9/2002

(Continued)

OTHER PUBLICATIONS

3GPP S2, "Report on Alternative Architectures for Combining CS Bearers with IMS; TR 23.899 V1.2.0 Release 6," 1-55 (Jun. 2005) http://www.3gpp.org/ftp/Specs/html-info/23899.htm [retrieved on Sep. 7, 2006].

(Continued)

*Primary Examiner* — Gregory Sefcheck
*Assistant Examiner* — Minh-Trang Nguyen
(74) *Attorney, Agent, or Firm* — Leydig, Voit & Mayer, Ltd.

(57) ABSTRACT

An interworking network element, an interworking system between the CSI terminal and the IMS terminal and the method thereof, which relate to the communication technology, enable the CSI terminal and the IMS terminal to interwork and the effective bearing link to be established according to the actual requirement. The interworking network element CSI-IW is added at the network of the called side between the CSI terminal and the IMS terminal. The network element receives the session request from the IMS terminal, determines whether there is need to separate the IMS session including the real time media request and non-real time media request into the two IMS sessions including the real time media request and non-real time media request respectively, and chooses the CS domain or the IMS domain to end the call according to the attribute information of the session, the ability for accessing the network, the ability of the terminal etc, so that the real time session can be borne by the CS domain as possible as it can.

3 Claims, 5 Drawing Sheets

U.S. PATENT DOCUMENTS

| | | | |
|---|---|---|---|
| 7,359,373 B2* | 4/2008 | Kuusinen et al. | 370/352 |
| 2003/0026245 A1 | 2/2003 | Ejzak | |
| 2004/0076145 A1* | 4/2004 | Kauhanen et al. | 370/352 |
| 2005/0083909 A1* | 4/2005 | Kuusinen et al. | 370/352 |
| 2005/0141484 A1* | 6/2005 | Rasanen | 370/352 |
| 2007/0133563 A1 | 6/2007 | Hundscheidt et al. | |
| 2008/0043717 A1* | 2/2008 | Bellora et al. | 370/352 |

FOREIGN PATENT DOCUMENTS

| | | |
|---|---|---|
| CN | 1812601 A | 8/2006 |
| EP | 1 863 236 A2 | 12/2007 |

OTHER PUBLICATIONS

3GPP Technical Specification Group Services and Systems Aspects, "Study on Handling the Termination of Real-Time Sessions and Calls (Release 7)," 1-11 (Mar. 2006) http://www.3gpp.org/ftp/Specs/archive/23_series/23.819/23819-020.zip [retrieved on Dec. 10, 2008].

Rim, "Use of GRUUs with CSI for Addressing," 1-12 (Jul. 1, 2005) http://ww.3gpp.org/ftp/tsg_sa/WG2_Arch/TSGS2_47_Montreal/Docs/S2-051661.zip [retrieved on Dec. 10, 2008].

Samsung, "CSI Interworking with Pure IM SUE," 1-3 (Nov. 11, 2005) http://www.3gpp1.org/ftp/tsg_sa/WG2_Arch/TSGS2_49_Yokosuka/Docs/52-052518.zip [retrieved Dec. 10, 2008].

$1^{st}$ Office Action in corresponding Chinese Application No. 200610077923.2 (Mar. 6, 2009).

$1^{st}$ Office Action in corresponding European Application No. 07702010.5 (Sep. 1, 2009).

Written Opinion of the International Searching Authority in corresponding PCT Application No. PCT/CN2007/000078 (Apr. 19, 2007).

"S2-052518—CSI interworking with pure IMS US," 3GPP TSG SA WG2 #49, Nov. 7-11, 2005, 3rd Generation Partnership Project, Yokosuka, Japan.

"Tdoc S2-051661—Use of GRUUs with CSI for addressing," 3GPP TSG-SA WG2 #47, Jun. 27-Jul. 1, 2005, 3rd Generation Partnership Project, Montreal, Canada.

"Technical Specification Group Services and Systems Aspects; Network architecture (Release 7)," 3GPP TS 23.002, Dec. 2005, Version 7.0.0, 3rd Generation Partnership Project, France.

* cited by examiner

INTERWORKING NETWORK ELEMENT, INTERWORKING SYSTEM BETWEEN THE CSI TERMINAL AND THE IMS TERMINAL AND THE METHOD THEREOF

CROSS-REFERENCE TO RELATED APPLICATIONS

This application is a continuation of International Application No. PCT/CN2007/000078, filed Jan. 9, 2007, which claims priority to Chinese Patent Application No. 200610023170.7, entitled "SYSTEM FOR INTERWORKING BETWEEN CSI TERMINAL AND VOIP TERMINAL, INTERWORKING FUNCTION, AND METHOD THEREOF," filed Jan. 9, 2006 and Chinese Patent Application No. 200610077923.2, entitled "INTERWORKING NETWORK ELEMENT, INTERWORKING SYSTEM BETWEEN THE CSI TERMINAL AND THE IMS TERMINAL AND THE METHOD THEREOF," filed Apr. 26, 2006, all of which are hereby incorporated by reference in their entirety.

FIELD OF THE INVENTION

The present invention relates to communication technologies, and in particular to an interworking network element, and a system and method for interworking between a Combining CS and IMS services (CSI) capable terminal and an IP Multimedia Subsystem (IMS) terminal.

BACKGROUND OF THE INVENTION

IP Multimedia Subsystem (IMS) is a subsystem for providing Internet Protocol (IP) multimedia service put forward by 3rd Generation Partnership Project (3GPP). In the IMS, a Packet Switch (PS) domain is employed as a channel for bearing upper layer control signaling and media transfer, and Session Initial Protocol (SIP) is introduced as service control protocol. Service control and bearer control are separated, so as to provide abundant multimedia services.

The main functional entities in the architecture of IMS network include a Call Session Control Function (CSCF) entity for controlling functions such as subscriber registration and session, a Home Subscriber Server (HSS) for collectively managing the subscription data of a subscriber, and an Application Server (AS) for providing various service logic control functions. In addition, the architecture of IMS network further includes a Multimedia Resource Control Function (MRCF) entity and a Policy Decision Function (PDF) entity, etc. And, in terms of the roles and functions, the CSCF may be further divided into Proxy-CSCF (P-CSCF), Interrogating-CSCF (I-CSCF), serving-CSCF (S-CSCF) etc., which logically accomplish different functions in SIP session routing respectively, and physically may be set integrally or separately. A proxy node P-CSCF in a location where a subscriber presently lies is used by the subscriber to access the IMS, a home domain service node S-CSCF in a location where the registration is made is used to accomplish the session and service trigger control and the service control interaction with the AS, and the I-CSCF performs the function of routing query.

In view of the architecture, the IMS is a network irrelevant to access technologies. Subscribers may experience the same service no matter whether Asymmetric Data Subscriber Line (ADSL) computer access or Wideband Code Division Multiple Access (WCDMA) mobile phone wireless access is used. The architecture of IMS network is divided into an access interconnection layer, a session layer and an application layer.

The access interconnection layer mainly accomplishes the functions of initiating and terminating an SIP session of various SIP terminals, implementing conversions among various bearer types of IP packet bearers, implementing various policies of Quality of Service (QoS) according to deployment of service and control of the session layer, and accomplishing the interconnecting and interworking with a traditional Public Service Telecommunication Network (PSTN)/Public Land Mobile Network (PLMN). The access interconnection layer includes various SIP terminals, wired access, wireless access, interconnecting and interworking gateway, etc.

The session layer accomplishes basic session control, accomplishes subscriber registration and SIP session routing control, interacts with the application server to perform functions of session, subscriber data maintenance and management, service QoS policy management, etc., and provides a consistent service environment for all the subscribers in conjunction with the application layer. When networking is practiced, for the division and deployment thereof, it is necessary to take comprehensive consideration of the access mode of IMS service, the location of the IMS access point, the capacity and capability of the CSCF, and demand on traffic of the subscribers. In addition, the topology hiding and interworking demand of the operator network are also considered. The P-CSCF is an ingress through which a User Equipment (UE) accesses the IMS system, so that the functions of Proxy and UserAgent in SIP protocol are implemented. The S-CSCF plays a key role in an IMS core network. The S-CSCF is responsible for UE registration authentication and session control, performs basic session routing function for IMS subscribers of a calling terminal as well as a called terminal, and performs value-added service trigger and service control interaction to the AS when conditions are met according to IMS trigger rules subscribed by the subscriber. The I-CSCF functions as a gateway node in the IMS core network. The I-CSCF provides functions of service node allocation for the subscriber in the current domain, routing query, and topology hiding between different IMS, and determines which S-CSCF provides services to the subscriber according to various combined conditions.

The application layer provides the subscriber with service logic, including implementing traditional basic telephone services, such as call transfer, call wait, conference, etc. The IMS implements inheritance of intelligent service existing in a Circuit Switch (CS) and a Packet Switch (PS) by use of interworking of an IP Multimedia-Services Switching Function (IM-SSF) entity with traditional intelligent service.

In addition to existing service in the CS and the PS, the IMS architecture may also provide SIP-based nontraditional telecommunication service via the AS, such as multimedia service, talk-back mobile phone, Presence, etc. Additionally, the IMS may provide a simple Application Program Interface (API) via an Open Services Access-Gateway (OSA-GW), so that a third party may securely use network resources and provide service via the interface, implementing abundant entertainment and game services. In addition, the IMS fully considers the demand of practical operation and works out specifications on QoS, security, billing, and interworking with other networks.

The SIP is a basic protocol of an IMS control layer, is one of multimedia communication system frame protocols, is an application layer protocol for establishing, changing or terminating a multimedia session, and accomplishes session establishment and media negotiation in the IMS in cooperation with a multimedia stream protocol. As a control layer protocol, the advantage of the SIP lies in that it is based on an open Internet standard, readily implements interconnecting and interworking among different networks as well as more abundant service features, supports a function of mobility of the application layer, and has simplicity and well-known extension potential.

SIP messages are divided into a Request message which is sent from a client to a server and a Response message which is sent from the server to the client. An SIP message consists of a Start-Line, a message header consisting of one or more Fields, a CRLF marking the end of the message header, and an optional Message Body. Message headers are divided into a General-Header, a Request-Header, a Response-Header and an Entity-Header. Here, a header that describes the message body is referred to as an Entity-Header. Start-Lines are divided into a Request-Line and a Status-Line. Here, the Request-Line is the Start-Line of a request message, and the Status-Line is the Start-Line of a response message.

The SIP implements control of a call mainly by use of the following six methods: INVITE, which indicates that a subscriber or service joins a session, and the message body part of which contains information description of the called; ACK, which is mainly adapted to acknowledge that a client terminal has responded to the request of the INVITE; BYE, which is adapted to send by the client a message to the server to terminate the call; CANCEL, which is adapted to cancel a suspended call; REGISTER, which is adapted to register information on the client with a location server; and OPTIONS, which is adapted to query information on and functions of the server. The SIP mainly defines the following five types of response statuses: 1xx: information, which indicates that the request has been received and the request may be processed subsequently; 2xx: correct, which indicates that the call has been received and processed correctly; 3xx: redirection, which indicates that the call needs to be redirected and processed; 4xx: client error, which indicates that a representation error exists in the message and the message can not be processed by the server; and 5xx: server error, which indicates that the server can not process the message.

In the SIP model, in order to establish a session, a subscriber proxy client terminal initiates a request to a subscriber proxy server for routing in the network via the subscriber proxy server. In addition, a registration server provides location information of the subscriber proxy client terminal, because it needs to map the SIP address to an IP address.

The subscriber proxy client terminal in the IMS is a UE. The subscriber proxy server and registration server in the IMS refer to the CSCFs. Here, the S-CSCF acts as the registration server and activates application service control based on subscriber data; the P-CSCF is the first contact point of the UE in the IMS network, and a SIP signaling message is delivered between the P-CSCF and the UE; and the I-CSCF is the first contact point for an external network, especially for an external IMS network. The IMS uses "home control", i.e. session control signaling is always in the charge of an S-CSCF that lies in the home network. The P-CSCF may be in the home network or in a visited network.

The IMS is regarded as an objective network of the telecommunication core network. However, a phase of history has to be involved in the evolution from the 3GPP to the IMS.

What Combining CS and IMS services (CSI) concern is how to combine CS domain service of 3G with IMS service.

The function of a Network Domain Selection (NeDS) entity is to determine whether an incoming call from a subscriber terminal is terminated in a CS domain or in an IMS according to related information upon receiving the call. The information dependent upon which the NeDS makes the determination includes registration status information of the subscriber and the terminal in the CS domain and IMS, capability information of an IP Connectivity Access Network (IP CAN) in which the subscriber and the terminal exist, and preference information of the subscriber and the operator.

The IMS also bears Voice over IP (VoIP) service. Therefore, interworking between a VoIP terminal and a CSI capable terminal has to be addressed. When a CSI UE interworks with a VoIP UE, a problem will arise. If the VoIP calls the CSI UE, the VoIP UE establishes a voice session only using an IMS signaling. The IMS session directly reaches an IMS part of the CSI UE. After the CSI UE receives the request message, it directly establishes a VoIP voice session between the two terminals. Due to limitation of the QoS of VoIP on the CSI UE side, the CSI UE can not establish a real-time session connection using the PS domain. For example, the PS domain on the CSI side may not have the capability to provide real-time voice communication service, and thus the interworking between the CSI and the VoIP terminals can not be implemented. Therefore, in the prior art, after the IMS network is converged, complete interworking between the CSI and the VoIP terminals can not be addressed.

In practical applications, the above solution can not address interworking between IMS terminals such as a CSI capable terminal and a VoIP terminal.

The main reason that causes such a case lies in that when a VoIP terminal or other IMS terminal calls a CSI capable terminal, only an IMS PS connection can be established, and the CSI capable terminal can not select a CS domain to bear real-time service.

SUMMARY OF THE INVENTION

The invention provides an interworking network element, a system and method for interworking between a CSI capable terminal and an IMS terminal, so that a CSI capable terminal and an IMS terminal can interwork with each other, and that a high-efficiency bearer link may be established according to practical requirement.

According to embodiments of the invention, there is provided a method for interworking between a CSI capable terminal and an IMS terminal, including:

initiating, by an IMS terminal, an IMS session request to a CSI capable terminal; and receiving, by an interworking network element that locates between the IMS terminal and the CSI capable terminal, the session request; and performing, by the interworking network element, service logic control to accomplish establishment of a session between the CSI capable terminal and the IMS terminal.

According to embodiments of the invention, there is provided an interworking network element, including:

a message processing module adapted to receive and send a message; and a session processing module adapted to perform service logic control and to accomplish establishment of a session between a CSI capable terminal and an IMS terminal when the message processing module receives an IMS session request initiated by the IMS terminal to the CSI capable terminal.

According to embodiments of the invention, there is provided a system for interworking between a CSI capable terminal and an IMS terminal, including a CS domain and a multimedia subsystem domain, and further including:

an interworking network element adapted to perform service logic control and to accomplish establishment of a session between a CSI capable terminal and an IMS terminal when an IMS session request initiated by the IMS terminal to the CSI capable terminal is received.

According to embodiments of the invention, a CSI Interworking (CSI-IW) network element of the called-side network between a CSI capable terminal and an IMS terminal receives a session request from a calling IMS terminal and performs service logic control, so that interworking may be implemented between the CSI capable terminal and the IMS terminal, and that a high-efficiency bearer link may be established according to practical requirement.

DETAILED DESCRIPTION OF THE EMBODIMENTS

To make the objects, technical solution and advantages of the invention more apparent, the invention will now be further described in detail in conjunction with the drawings.

According to the embodiments of the invention, in order to implement interworking between a CSI capable terminal and a VoIP terminal across IMS/3G network, a CSI Interworking (CSI-IW) network element is added between the CSI capable terminal and the VoIP terminal. The CSI-IW is adapted to receive a session request from a calling VoIP terminal, to split the session according to session attribute information, access network capability, terminal capability, registration status of the CSI capable terminal subscriber in the CS domain, etc., and to merge response messages of two independent sessions of the CSI capable terminal and send to the VoIP terminal. The CSI-IW may also select a CS domain to terminate a real-time session or select an IMS to terminate a non-real-time session, so that the real-time media can be carried on the CS domain to the greatest extent to meet requirements for QoS. When CS domain bearer of the CSI capable terminal is established, based on enhanced functions of the CSI capable terminal, the embodiments of the invention may employ two modes to establish the CS domain bearer: the CSI-IW instructs the CSI capable terminal to initiate a terminal-to-network session establishment request; or the CSI-IW directly initiates a network-to-terminal session establishment request to the CSI capable terminal.

Additionally, according to embodiments of the invention, the CSI-IW sets calling preference information of the non-real-time session request message, and an S-CSCF performs further routing according to the preference information set by the CSI-IW. The set calling preference information includes one or any combination of "CS video" capability of the CSI capable terminal, "CS voice" capability of the CSI capable terminal, PMI information of the CSI capable terminal, and ServiceID information of the CSI service.

Additionally, according to embodiments of the invention, the CSI-IW uses Globally Routable User Agent URI (GRUU) information of the IMS of the CSI capable terminal in the non-real-time session request message as the Request Uniform Resource Identifier (URI) of the request message, and the S-CSCF performs further routing according to the GRUU information.

Additionally, according to embodiments of the invention, after the CSI-IW receives a real-time session failure response message, the following failure processing is adopted: the IMS of the CSI capable terminal is selected to terminate the real-time session; or only non-real-time media session is established between the CSI capable terminal and the VoIP terminal.

Additionally, according to embodiments of the invention, after the CSI-IW receives a non-real-time session failure response message, the failure processing may be performed in such a way that only a real-time media session is established between the CSI capable terminal and the VoIP terminal.

Additionally, according to embodiments of the invention, an S-CSCF in the home domain of the CSI capable terminal routes all the initial IP multimedia session requests received from the VoIP terminal to the CSI-IW for processing, and the CSI-IW determines whether to stay in the session path according to one or combination of the following information: information on whether the called terminal has CSI capability, the capacity information of the access network in which the called terminal lies.

The S-CSCF in the home domain of the CSI capable terminal determines whether to route the session request to the CSI-IW for processing according to the media attribute information in the session.

According to embodiments of the invention, in the direction in which the CSI capable terminal calls the VoIP terminal, the CSI-IW also matches and correlates the session request with an existing IMS session on the called VoIP terminal side, and assembles sessions of different domains between the same pair of terminals on the IMS side. For supplementary services such as call transfer, call termination, call restriction, etc. that occur in the CS domain of the CSI capable terminal, embodiments of the invention also set a CSI-IW for the corresponding processing, so that the network service function may be improved.

Figure 1:
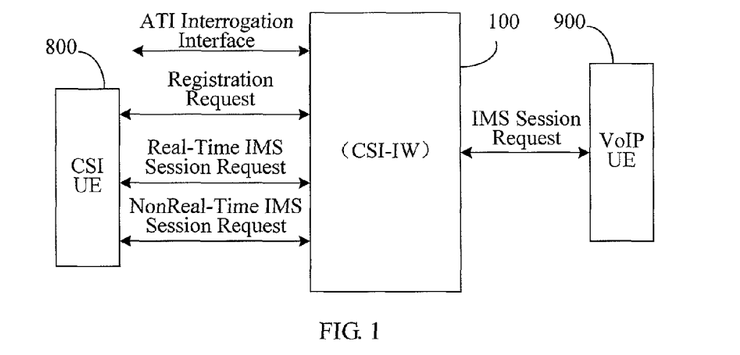
FIG. 1 is a block diagram illustrating a system for interworking between a CSI capable terminal and a VoIP terminal according to embodiments of the invention.

FIG. 1 is a structural block diagram illustrating a system for interworking between a CSI capable terminal and a VoIP terminal according to embodiments of the invention. The system includes a CSI-IW 100 and a related CSI capable terminal 800 (a CSI UE in FIG. 1), and a VoIP terminal 900 (a VoIP UE in FIG. 1). Here, the CSI-IW 100 lies on the called network side. Calls in the two directions both pass through the CSI-IW 100. An IMS session request initiated by the VoIP terminal 900 first passes through the CSI-IW 100 and then reaches the CSI capable terminal 800. And, a real-time or non-real-time call initiated by the CSI capable terminal 800 in the CS domain or IMS also first passes through the CSI-IW 100 for processing and then reaches the VoIP terminal 900. In addition, the CSI capable terminal 800 further needs to register with the CSI-IW 100 and report related information.

The CSI-IW is adapted to receive an IMS session request from a calling VoIP terminal on the called CSI capable terminal-side network, to split the session, and to determine whether the CS domain or the IMS is selected to terminate the related real-time or non-real-time session according to information on domain selection, so that a session between the CSI capable terminal and the VoIP terminal is established. The information on domain selection includes capability information of the access network in which the CSI capable terminal lies, registration status information of the CSI capable terminal subscriber in the CS domain, and subscription information of the CSI capable terminal subscriber.

When an IMS session request sent from the VoIP terminal is received, the CSI-IW determines whether the session is split into independent real-time session and non-real-time session or not, and determines whether the session is terminated in the CS domain or the IMS of the CSI capable terminal.

When performing domain selection, the CSI-IW needs to obtain related information such as capability information of the CSI capable terminal, capability information of an IP access network in which the CSI capable terminal lies, correlation information between a CS domain number and an IMS number of the CSI capable terminal, registration status information of a subscriber of the CSI capable terminal in the CS domain, and attribute information of an ongoing session and call.

The CSI-IW may obtain the related information above in such a way that the CSI-IW adopts mechanisms defined by RFC3840 and RFC3841 to obtain the capability information of the terminal. The CSI capable terminal carries the correlation between the CS number and the IMS number of the current terminal in the IMS registration information, so that the CSI-IW may obtain this correlation information. Otherwise, a fixed numbering rule is employed, so that the CSI-IW may obtain one number of the CSI capable terminal according to another number of the CSI capable terminal. The CSI-IW queries and obtains location information of the CSI capable terminal in the CS domain via an Anytime Interrogate (ATI) interface, and then queries the local data configuration according to the location information to obtain the capacity information of the CS access network in which the CSI capable terminal lies currently. The CSI-IW obtains the type of the IMS access network in which the CSI capable terminal lies currently via location field information (such as P-Access-network-Info) carried in the IMS message, so that the capacity information of the IMS access network is obtained. Otherwise, the CSI-IW queries and obtains location information of the CSI capable terminal in the IMS via the ATI interface, and then queries the local data configuration according to the location information to obtain the capacity information of the IMS access network in which the CSI capable terminal lies currently. The CSI-IW may be selected as an IMS AS to join in the session path between the VoIP terminal and the CSI capable terminal, so that the attribute information of the ongoing session and call may be obtained.

According to embodiments of the invention, reference may be made to principles as follows when the CSI-IW performs domain selection.

If the IMS session request from the VoIP terminal only includes a real-time media and the IP access network in which the CSI capable terminal lies can not provide real-time service bearer capability, the CSI-IW decides that the real-time session is terminated in the CS domain of the CSI capable terminal.

If the IMS session request from the VoIP terminal only includes a non-real-time media and the CS access network in which the CSI capable terminal lies can not provide the non-real-time service bearer capability, the CSI-IW decides that the non-real-time session is terminated in the IMS of the CSI capable terminal.

If the IMS session request from the VoIP terminal includes real-time and non-real-time medias simultaneously and the IP access network in which the CSI capable terminal lies can only provide non-real-time service bearer capability, the CSI-IW splits the IMS session request from the VoIP terminal into two IMS sessions, a real-time session and a non-real-time session, and decides that the non-real-time session is terminated in the IMS of the CSI capable terminal and the real-time session is terminated in the CS domain of the CSI capable terminal.

If both the CS access network and the IMS access network of the CSI capable terminal can carry the real-time media or non-real-time media contained in the IMS session request from the VoIP terminal, the CSI-IW makes further determination according to the capability information of the CSI capable terminal in the CS domain and in the IMS. If the CS part of the CSI capable terminal can not carry non-real-time media, the IMS of the CSI capable terminal is selected to terminate the non-real-time session. If the IMS part of the CSI capable terminal can not carry real-time media, the CSI-IW selects that the real-time session is terminated in the CS domain.

However, the CSI-IW may also determine in which domain to terminate the session according to a local policy. For example, the CS domain is preferably selected to terminate the real-time session, and the IMS is preferably selected to terminate the non-real-time session, so that the QoS of the real-time service may be guaranteed, and the utilization of the network resources may be improved at the same time.

In addition, the CSI-IW may establish a CS domain bearer between the CSI capable terminal and the VoIP terminal in network-to-terminal mode or in terminal-to-network mode. Here, in the network-to-terminal mode, the CSI-IW directly initiates a call request to the CS domain of the CSI capable terminal. In the terminal-to-network mode, the CSI-IW instructs the CSI capable terminal to initiate a CS establishment request to the network. Here, the CSI capable terminal includes an enhanced function for initiating a CS establishment request to the network as indicated by the CSI-IW.

The CSI-IW is further adapted to receive a session request initiated from the CSI capable terminal in the called VoIP terminal-side network, and matches and correlates the session request with an existing IMS session according to information carried in the session request. When an IMS session request from the CSI capable terminal to the VoIP terminal is received, an existing IMS session will be correlated and matched according to related information. The information for the CSI-IW to correlate and match the session request with an existing IMS session includes, but is not limited to, number information of the CSI capable terminal and number information of the VoIP terminal. If the match succeeds, it indicates that an IMS session from the CSI capable terminal to the VoIP terminal already exists, and the CSI-IW initiates a process for modifying the existing session. If the match fails, it indicates that no IMS session from the CSI capable terminal to the VoIP terminal exists, and the CSI-IW forwards the IMS session request to the VoIP terminal for processing.

When renegotiation occurs on an existing session established between the CSI capable terminal and the VoIP terminal, the CSI-IW is further adapted to determine whether the session needs to be split again according to the renegotiation result and performs domain selection on the CSI capable terminal side again according to information on domain selection so as to reestablish a bearer.

In a practical network configuration, NeDS and CSI-IW logic functions may be set integrally. In other words, CSI-IW function may be enhanced on a NeDS functional entity, so that the enhanced NeDS can accomplish the interworking control function between a CSI capable terminal and a VoIP terminal.

In network service function, it is inevitable that various supplementary services may occur on the CS part of the CSI capable terminal. For the supplementary services, the CSI-IW also needs to perform corresponding processing. The special processing procedure of the supplementary services will be illustrated in detail in the method part of the invention.

When a call transfer-type service occurs on the CS part of the CSI capable terminal-side session, the CSI-IW releases the CS domain bearer of the CSI capable terminal and deletes the real-time session part on the calling VoIP terminal side. Alternatively, the CSI-IW keeps the CS domain bearer of the CSI capable terminal and notifies the calling VoIP terminal, and the VoIP terminal processes release and establishment of the call transfer service-related session.

When a call termination-type service occurs on the CS part of the CSI capable terminal-side session, the CSI-IW is adapted to notify the calling VoIP terminal, and the VoIP terminal performs the corresponding modification on its IMS session.

When a call restriction-type service occurs on the CS part of the CSI capable terminal-side session, if the CSI-IW establishes the CS domain bearer in the terminal-to-network mode, a special E164 number is configured for the CSI-IW to break through the call restriction service. If the CSI-IW establishes the CS domain bearer in the network-to-terminal mode, the CSI-IW only establishes a non-real-time session part or notifies the calling VoIP terminal that the call fails.

According to embodiments of the invention, by performing session disassembly, response message assembly and domain selection on the called CSI capable terminal side via the CSI-IW, both the real-time part and non-real-time part of the IMS session may be born in the appropriate domain, so that the QoS of the real-time service may be guaranteed. And, the IMS session is matched and correlated on the called IMS terminal side, so that network resources may be saved and network utilization efficiency may be improved. The implementation of various supplementary services may improve the service functions in the IMS transition stage, improve the subscriber experience and enhance the market competitive power.

In a method for interworking between a CSI capable terminal and a VoIP terminal according to embodiments of the invention, when a VoIP terminal calls a CSI capable terminal, the CSI-IW determines whether the session needs to be split or not and domain selection is performed. In other words, the VoIP terminal initiates an IMS session request to the CSI capable terminal, and the request is forwarded to the CSI-IW. The CSI-IW determines whether the CS domain or the IMS is selected to terminate the related real-time and non-real-time session according to decision of domain selection. Then, a session between the CSI capable terminal and the VoIP terminal is established. The domain selection principle of the CSI-IW may be that the CS domain is preferably selected to terminate the real-time session, and that the IMS is preferably selected to terminate the non-real-time session. However, the selection may also be performed according to a local policy that is preset.

In specific implementation, after the CSI-IW receives an IMS session request from the VoIP terminal, the CSI-IW processes the IMS session request according to related information (including capacity information of the CSI capable terminal, capacity information of CSI IP access network, and correlation information between the CS number and IMS number of the CSI capable terminal), registration status information of the CSI capable terminal subscriber in the CS domain, and the service logic. Specifically, what the process includes is as follows.

If the IMS session from the VoIP terminal only includes a real-time media and the IP access network in which the CSI capable terminal lies can not carry real-time media, the CSI-IW decides that the CS domain of the CSI capable terminal is selected to terminate the real-time session.

If the IMS session from the VoIP terminal only includes a non-real-time media and the CS access network in which the CSI capable terminal lies can not carry non-real-time media, the CSI-IW decides that the IMS of the CSI capable terminal is selected to terminate the non-real-time session.

If the IMS session from the VoIP terminal includes real-time and non-real-time media simultaneously and the IP access network in which the CSI capable terminal lies can only carry non-real-time media, the CSI-IW splits the IMS session request from the VoIP terminal into two IMS sessions, a real-time session and a non-real-time session, and decides that IMS of the CSI capable terminal is selected to terminate the non-real-time session, and that CS domain of the CSI capable terminal is selected to terminate the real-time session.

If both the CS access network and the IMS access network of the CSI capable terminal can carry the real-time media or non-real-time media contained in the IMS session from the VoIP terminal, the CSI-IW makes further determination according to the capability information of the CSI capable terminal in the CS domain and the IMS. If the CS part of the CSI capable terminal can not carry a non-real-time media, the IMS of the CSI capable terminal is selected to terminate the non-real-time session. If the IMS part of the CSI capable terminal can not carry the real-time session, the CSI-IW determines that the CS domain is selected to terminate the real-time session. If determination can not be made according to the information above, the CSI-IW uses a local policy to determine which domain is selected to terminate the sessions.

When a CS domain bearer is established, two optional directions to establish a CS domain bearer part of the session between the CSI capable terminal and the VoIP terminal are network-to-terminal or terminal-to-network.

In this step, the CSI-IW may use one of the two directions, terminal-to-network and network-to-terminal, to establish a CS domain bearer between the CSI-IW and the CSI capable terminal. If the CSI-IW selects to initiate a CS domain bearer establishment request in the direction of network-to-terminal, it directly initiates a session request to the CS part of the CSI capable terminal. If the CSI-IW selects to initiate a CS domain bearer establishment request in the direction of terminal-to-network, it carries instruction information, which instructs the CSI capable terminal to initiate a terminal-to-network CS establishment, in the IMS session request sent to the CSI capable terminal.

Here, in the terminal-to-network mode, the CSI-IW needs to send an instruction to the CSI capable terminal, for example, in such a mode that the IMS AS carries information on a definite instruction in the IMS session message, such as that real-time SDP information is used to represent the instruction information.

At this point, the CSI capable terminal performs corresponding processing on the request from the CSI-IW. If the IMS AS initiates a CS call request in the direction of network-to-terminal, the CSI capable terminal respond to the real-time session request from the CSI-IW. If the IMS AS initiates a CS call request in the direction of terminal-to-network, after the CSI capable terminal receives the instruction information, the CS part of the CSI capable terminal initiates a call request to the IMS AS.

When a CSI capable terminal calls a VoIP terminal, the call is also to pass through the CSI-IW for being assembled, so that the IMS connections on the VoIP terminal side may be unified and allocated. The CSI capable terminal initiates a session request to the VoIP terminal and forwards the session request to the CSI-IW, and the CSI-IW matches and correlates the session request with an existing IMS session according to information carried in the session request.

When the IMS network on the called VoIP terminal side receives a session request from the CSI capable terminal, the session request is sent to the CSI-IW for processing. After the CSI-IW receives the session request, the CSI-IW matches and correlates the session request with an existing IMS session according to related information in the request message. The information for the CSI-IW to correlate and match the session request with an existing IMS session includes, but is not limited to, number information of the CSI capable terminal and number information of the VoIP terminal. If the match succeeds, it indicates that an IMS session from the CSI capable terminal to the VoIP terminal already exists, and the CSI-IW initiates a process for modifying the existing session. If the match fails, it indicates that no IMS session from the CSI capable terminal to the VoIP terminal exists, and the CSI-IW forwards the IMS session request to the VoIP terminal for processing.

In this step, the CSI-IW may obtain the correlation between the CS number and the IMS number of the calling CSI capable terminal in such a mode that the CS number and the IMS number of the CSI capable terminal adopt the same Mobile Station International ISDN Number (MSISDN).

In addition, the CSI capable terminal further correlates the CS call of the present terminal with the IMS session. The CSI-IW processes the session between the CSI-IW and the CSI capable terminal. If a real-time session and a non-real-time session exist between the CSI-IW and the CSI capable terminal simultaneously, the CSI-IW assembles and sends media information of the real-time session and the non-real-time session to the VoIP terminal in an IMS session message.

Additionally, in the methods above in which the CSI capable terminal calls the VoIP terminal and the VoIP terminal calls the CSI capable terminal, if renegotiation occurs on the session established between the CSI capable terminal and the VoIP terminal, the CSI-IW redetermines whether the session needs to be split or not according to the renegotiation result, and redetermines whether the CS domain or the IMS of the CSI capable terminal is selected to establish the modified session according to related information. If supplementary service occurs on the CS part of the CSI capable terminal, the CSI-IW needs to perform corresponding processing, and the Media Gateway Control Function (MGCF) entity needs to enhance related functions.

As such, steps above performed by the CSI-IW may be integrated into the enhanced function of the NeDS for implementation.

Figure 2:
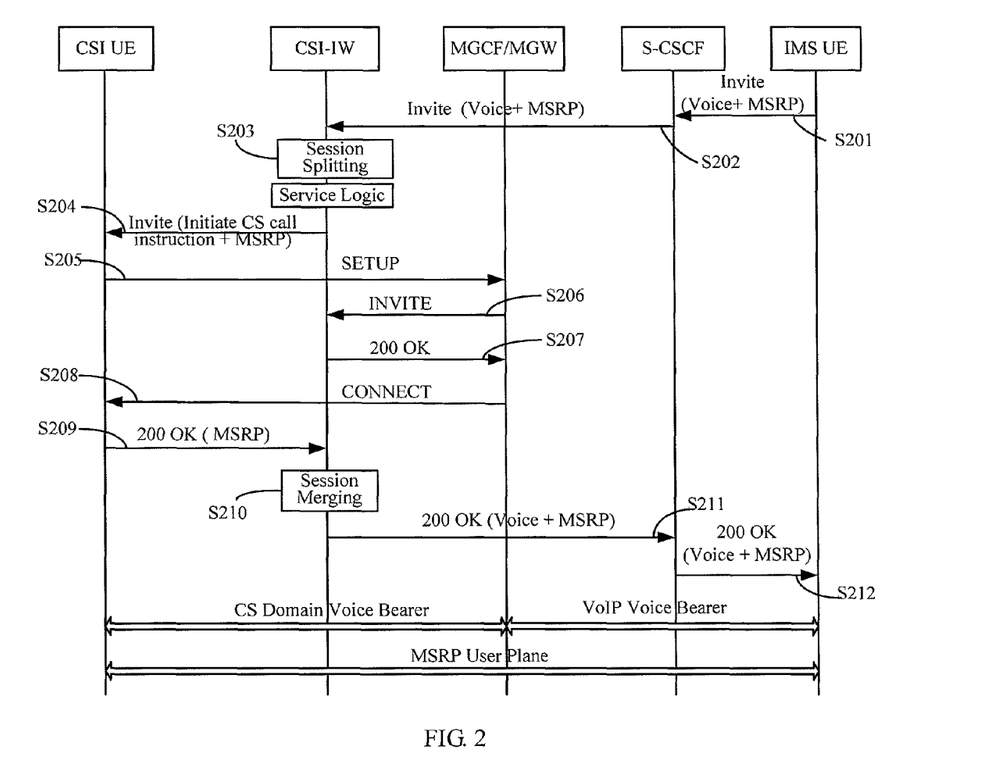
FIG. 2 is a flow chart illustrating a method for interworking when a VoIP terminal calls a CSI capable terminal according to embodiments of the invention.

FIG. 2 illustrates a call process in a case where a VoIP terminal calls a CSI capable terminal and the called CSI-IW establishes a CS domain bearer in a direction of terminal-to-network according to embodiments of the invention. The whole process is described as follows.

S201: A VoIP terminal initiates an IMS session request, which includes real-time media and non-real-time media, to a CSI capable terminal.

S202: An IMS on the VoIP terminal side forwards the request to a CSI-IW on the CSI capable terminal side.

Block S203: The CSI-IW performs service logic processing according to related information and splits the session request.

S204: The CSI-IW sends to the CSI capable terminal a session request including the non-real-time media and instruction information that requests the CSI capable terminal to initiate a CS domain bearer establishment in terminal-to-network direction.

Here, the CSI-IW may set calling preference information so that the IMS session request is sent to the IMS part of CSI capable terminal. Alternatively, the CSI-IW may set the Request URI in the session request message as the GRUU of the IMS part of the CSI capable terminal, so that the IMS session request is sent to the IMS part of CSI capable terminal. The set calling preference information may include one or any combination of "CS video" capability of the CSI capable terminal, "CS voice" capability of the CSI capable terminal, PMI information of the CSI capable terminal, and ServiceID information of the CSI service.

S205: After the CSI capable terminal receives the session request message, the CSI capable terminal initiates a CS call to the CSI-IW.

S206: The MGCF receives the CS call request from the CSI capable terminal, maps the CS call request into INVITE and sends the INVITE to the CSI-IW.

S207: The CSI-IW sends a response message of 200 OK to the MGCF.

S208: The MGCF maps the response message of 200 OK into a message of connect of the CS, and sends the connect to the CSI capable terminal.

S209: The CSI capable terminal sends a response message of 200 OK, which only includes MSRP media information.

Block S210: The CSI-IW merges the CS call response and the IMS session response from the CSI capable terminal.

S211: After performing the merging, the CSI-IW sends a response message of 200 OK to IMS network.

S212: The IMS forwards the message of 200 OK to the VoIP terminal.

Figure 3:
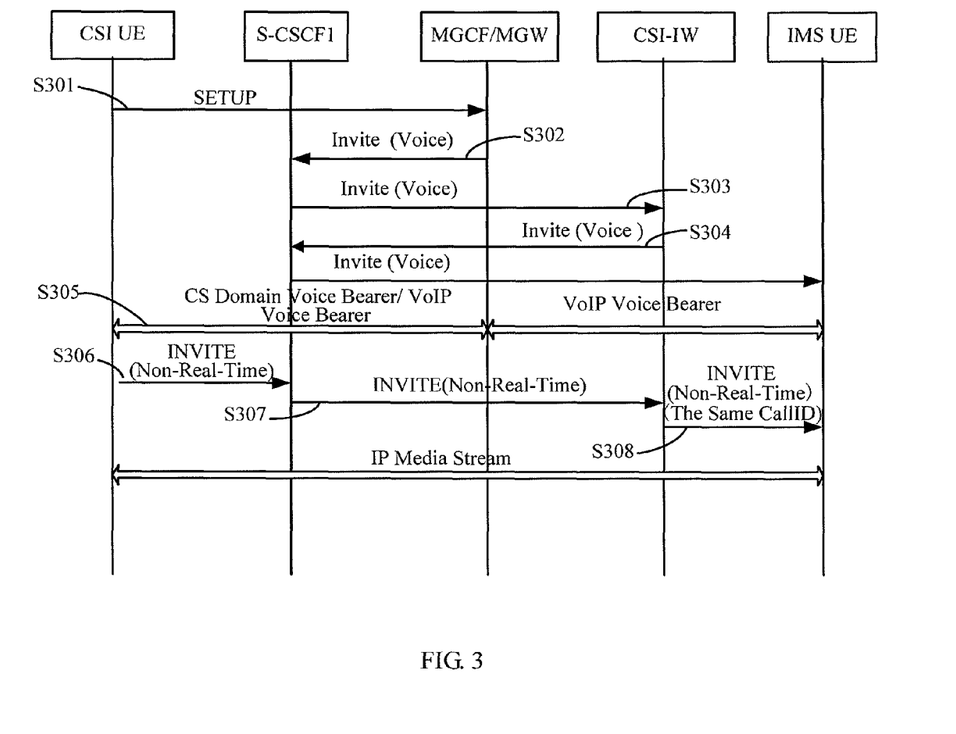
FIG. 3 is a flow chart illustrating a method for interworking when a CSI capable terminal calls a VoIP terminal according to embodiments of the invention.

FIG. 3 illustrates a call process in another case where a CSI capable terminal calls a VoIP terminal and a CSI-IW assembles an IMS session according to embodiments of the invention. The whole process is described as follows.

S301: A CSI capable terminal initiates a voice call request in a CS domain.

S302: A MGCF maps the CS signaling into INVITE and forwards the INVITE to a calling IMS network.

S303: The calling IMS network forwards the request message of INVITE to a CSI-IW in the calling network for processing.

S304: The CSI-IW forwards the request message to a VoIP terminal.

S305: A real-time service media stream is established between the CSI capable terminal and the VoIP terminal via an MGW.

S306: The CSI capable terminal initiates a non-real-time service request.

S307: The calling IMS network forwards the request information to the CSI-IW in the calling network for processing.

S308: The CSI-IW performs session match according to the calling and called number information. If the match succeeds, the CSI-IW initiates to the VoIP terminal a message for modifying an existing session, for example, a message of ReINVITE.

If the modification succeeds, a session that includes a real-time service media stream and a non-real-time service media stream is established between the CSI capable terminal and the VoIP terminal.

According to embodiments of the invention, the CSI-IW may process various supplementary services such as call transfer, call termination, call restriction, etc. that occur in the CS part of the CSI capable terminal.

The call transfer-type service includes services such as CFU, CFB, CFNRy, CFNRc and CD, etc. If the CSI-IW determines to establish a CS domain bearer in a direction of terminal-to-network, the CS part of the CSI capable terminal actively initiates a CS call to the IMS AS. Therefore, CS transfer-type service is not triggered on the CSI capable terminal. If the CSI-IW determines to establish a CS domain bearer in a direction of network-to-terminal, the CSI-IW initiates a session request to the CS part of the CSI capable terminal. The session request reaches the CS part of the CSI capable terminal via the MGCF. If transfer occurs on the CS part of the CSI capable terminal, the MGCF needs to firstly notify the CSI-IW of the forwarded number.

The MGCF may select to send the forwarded number of the CS domain to the CSI-IW via a message of 200 OK. After receiving the message from the MGCF, the CSI-IW may perform processing in such a way that the CSI-IW may select to release the forwarded CS call, keep or subsequently establish a non-real-time session between the CSI-IW and the CSI capable terminal. The CSI-IW deletes the real-time media information in the IMS session between the CSI-IW and the VoIP terminal. The CSI-IW may select to keep the forwarded CS call and notify the VoIP terminal via related SIP message (which includes, but is not limited to, Refer). The VoIP terminal may select to release the non-real-time IMS session between the VoIP terminal and the CSI capable terminal (if it has been established), and attempt to establish a non-real-time IMS session between the VoIP terminal and a new terminal. Alternatively, the VoIP terminal selects to release the real-time session between the VoIP terminal and the new terminal, and only keep (if having been established) or reestablish a non-real-time IMS session between the VoIP terminal and the CSI capable terminal.

Figure 4:
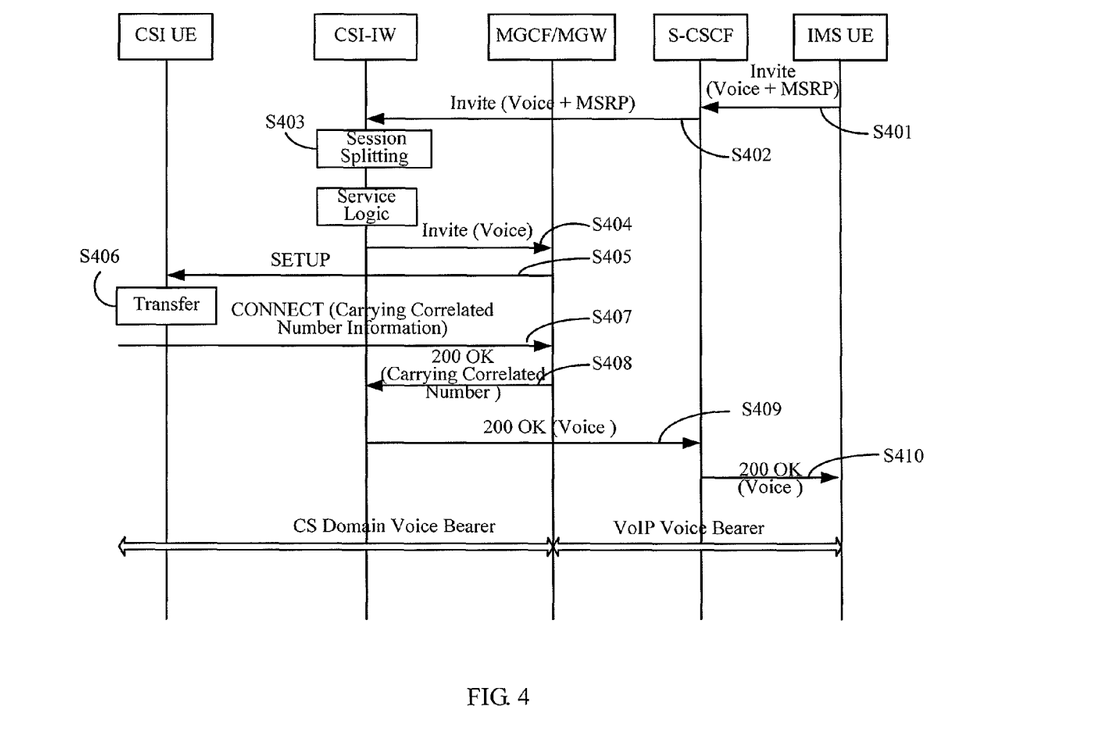
FIG. 4 is a flow chart illustrating a method for processing a call transfer-type supplementary service according to embodiments of the invention.

FIG. 4 illustrates a flow for processing call transfer-type supplementary service according to embodiments of the invention.

S401: A VoIP terminal initiates an IMS session request, which includes real-time media and non-real-time media, to a CSI capable terminal.

S402: IMS network in the VoIP terminal side forwards the request to a CSI-IW in the CSI capable terminal side.

Block S403: The CSI-IW performs service logic processing according to related information and splits the session request.

S404: The CSI-IW initiates a session request to the CS part of the CSI capable terminal.

S405: After receiving the session request information from the CSI-IW, MGCF maps the session request information into a message of SETUP in the CS domain and sends the SETUP to the CSI capable terminal.

Block S406: Transfer occurs on the CS part of the CSI capable terminal.

S407: The forward-to-terminal (not shown) sends a message of connect to the MGCF, and the MGCF obtain a forward-to number from the message of connect.

S408: The MGCF carries forward-to number in a message sent to the CSI-IW.

S409: The CSI-IW decides not to send the IMS session to the forward-to terminal. The CSI-IW sends a message of 200 OK, which carries voice media, to the IMS network in the VoIP terminal side.

S410: The IMS network in the VoIP terminal side forwards the message to the VoIP terminal. At this point, only a real-time service media stream exists between the VoIP terminal and the forwarded terminal.

Additionally, it should be noted that at S409, the CSI-IW may select to establish a subsequent IMS session between the CSI-IW and the CSI capable terminal. At this point, the CSI-IW will continue to send a message of INVITE (MSRP) of non-real-time media to the CSI capable terminal. After the CSI capable terminal sends a response to the message of INVITE, the CSI-IW merges and sends the response message to the VoIP terminal. At this point, non-real-time service exists between the VoIP terminal and the CSI capable terminal, and real-time service media stream exists between the VoIP terminal and the forwarded terminal.

If completion of call services such as Call Wait, Call Hold, etc. occurs on the CS part of the CSI capable terminal, the MGCF firstly needs to notify the CSI-IW of the service information. The MGCF may select to map information such as Call Wait, Call Hold, etc. in the CS domain into a message of UPDATE or ReINVITE, and then send the message to the CSI-IW.

After receiving the message, the CSI-IW may perform processing in such a way that the CSI-IW may select to send a related SIP message to the calling VoIP terminal and modify the IMS session, or that the CSI-IW may select to maintain the IMS session between the CSI-IW and the calling VoIP terminal.

If Explicit Call Transfer (ECT) service occurs on the CS part of the CSI capable terminal, the MGCF needs to notify the CSI-IW of the number of a new terminal obtained from the CS signaling. The MGCF may select to send the new number to the CSI-IW via a message of REFER.

After receiving the message from the MGCF, the CSI-IW may perform processing in such a way that the CSI-IW may select to release the forwarded CS call, keep or subsequently establish a non-real-time session between the CSI-IW and the CSI capable terminal. The CSI-IW deletes real-time media information in the IMS session between the CSI-IW and the VoIP terminal. Alternatively, the CSI-IW may select to keep the forwarded CS call and notify the VoIP terminal via related SIP message (which includes, but is not limited to, REFER). The VoIP terminal may select to release the non-real-time IMS session between the VoIP terminal and the CSI capable terminal (if it has been established), and attempt to establish a non-real-time IMS session between the VoIP terminal and a new terminal. Alternatively, the VoIP terminal may select to release the real-time session between the VoIP terminal and the new terminal, and only keep (if it has been established) or reestablish a non-real-time IMS session between the VoIP terminal and the CSI capable terminal.

Figure 5:
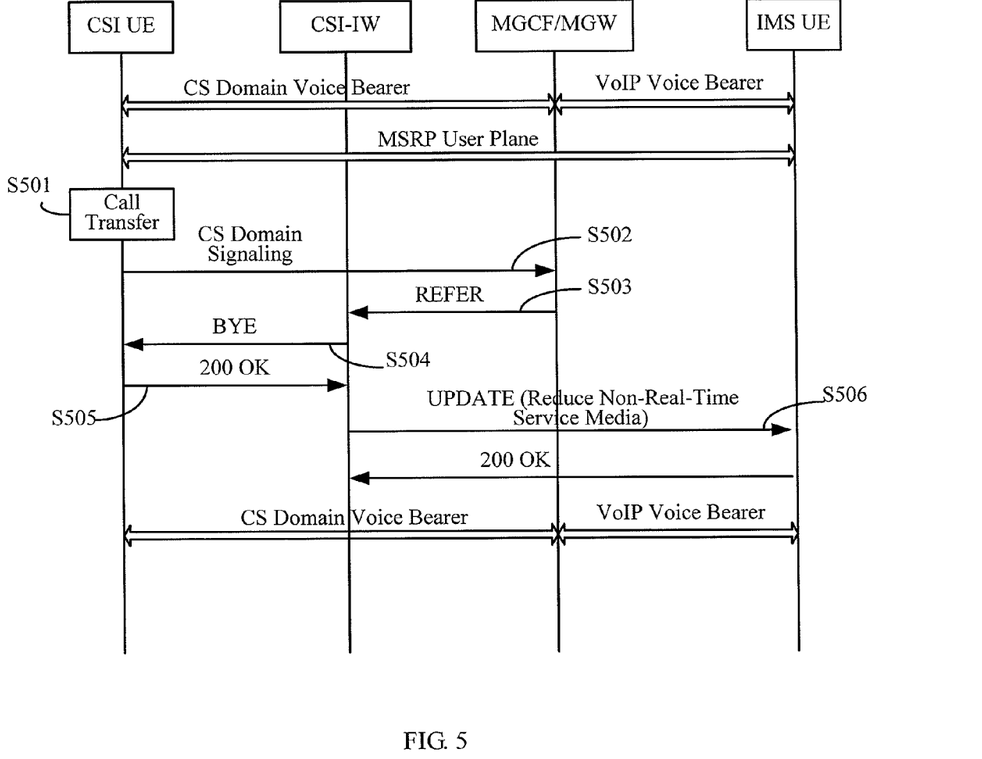
FIG. 5 is a flow chart illustrating a method for processing an ECT supplementary service according to embodiments of the invention.

FIG. 5 illustrates a flow for processing ECT supplementary service according to embodiments of the invention.

A connection that includes real-time and non-real-time session has been established between a CSI capable terminal and a VoIP terminal.

Block S501: Transfer occurs on the CS part of the CSI capable terminal.

S502: An MGCF obtains, via CS signaling, number information of a new terminal after transfer occurs on the CSI capable terminal.

S503: The MGCF notifies the CSI-IW of the transfer that occurs on the CS part of the CSI capable terminal and information of the transfer number via a message of REFER. In this step, the MGCF may also select a message of INVITE (replace) to deliver the information.

S504: The CSI-IW determines to release the IMS session between the CSI-IW and the CSI capable terminal. The CSI-IW sends a message of BYE to the IMS part of the CSI capable terminal.

At S504, the CSI-IW may select to forward the IMS session established between the CSI-IW and the CSI capable terminal to a new terminal. At this point, the CSI-IW will send a message of INVITE (MSRP) of non-real-time service to the new terminal. After the new terminal sends a response to the message of INVITE, the CSI-IW initiates a message for modifying the session to the VoIP terminal, and forwards the non-real-time service media of the VoIP terminal to the new terminal.

S505: The IMS part of the CSI capable terminal sends a message of 200 OK responding to the message of BYE.

S506: The CSI-IW sends a message of UPDATE to the VoIP terminal, modifies media information of the ongoing session, and deletes the non-real-time media information.

There is further call restriction-type supplementary service such as CUG, call restriction, ODB, etc.

If the CSI-IW determines to establish a CS domain bearer in a direction of terminal-to-network, the CS part of the CSI capable terminal actively initiates a CS call to the CSI-IW. At this point, such call restriction-type service may be broken through by configuring a special number (such as E164 number) for the CSI-IW.

If the CSI-IW determines to establish a CS domain bearer in a direction of network-to-terminal, the CSI-IW initiates a session request to the CS part of the CSI capable terminal. The session request reaches the CS part of the CSI capable terminal via the MGCF. If the call fails due to such call restriction service occurring on the CS part of the CSI capable terminal, the MGCF firstly needs to notify the CSI-IW of the reason of the failure.

After receiving the information, the CSI-IW may perform processing in such a way that the CSI-IW may select to keep (if it already exists) or reestablish a non-real-time IMS session between the CSI-IW and the CSI capable terminal and only carry non-real-time media information in the response to the VoIP terminal. Alternatively, the CSI-IW may release the non-real-time IMS session between the CSI-IW and the CSI capable terminal (if it already exists) or no longer establish a subsequent non-real-time IMS session between the CSI-IW and the CSI capable terminal, and return a response of failure to the VoIP terminal.

Figure 6:
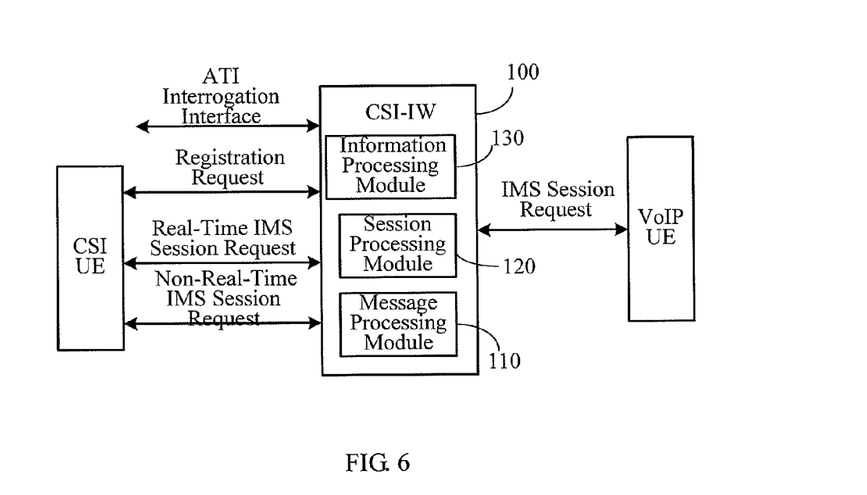
FIG. 6 is a schematic diagram illustrating the structure of a CSI-IW according to embodiments of the invention.

As shown in FIG. 6, a CSI-IW according to embodiments of the invention includes a message processing module 110, a session processing module 120, and an information processing module 130.

The message processing module 110 is adapted to receive and send a message between the CSI-IW and an external entity. The type of the message includes, but is not limited to, a type of IMS SIP message, a type of MAP ATI message, etc.

The session processing module 120 is adapted to perform service logic control and implement establishment of a session between a CSI capable terminal and an IMS terminal when the message processing module 110 receives an IMS session request initiated by the IMS terminal to the CSI capable terminal.

Here, when the CSI-IW lies in the home network of the CSI capable terminal, the process in which the session processing module performs service logic control may includes: determining whether it needs to split an IMS session from the calling VoIP terminal that includes a real-time media and a non-real-time media into two IMS sessions that include a real-time media and a non-real-time media respectively and send the two IMS sessions to the CSI capable terminal respectively; and determining whether the CS domain or the multimedia subsystem domain is selected to terminate the real-time or non-real-time session according to information on domain selection, so as to establish a session between the CSI capable terminal and the VoIP terminal. The module further includes a function of merging the response messages of two independent sessions of the CSI capable terminal and forwarding to the VoIP terminal.

Here, when the CSI-IW lies in the home network of the VoIP terminal, the process in which the session processing module performs service logic control may includes: determining whether the CSI-IW is adapted to receive a session request initiated by the CSI capable terminal in the network on the called VoIP terminal side, and matching and correlating the session request with an existing multimedia subsystem session according to information carried in the session request. If the match succeeds, the CSI-IW modifies the existing multimedia subsystem session and adds the media of the session. Otherwise, if the match fails, the CSI-IW forwards the session request to the VoIP terminal for processing. Here, the information for matching includes number information of the CSI capable terminal and number information of the VoIP terminal.

The information processing module 130 is adapted to communicate with the CSI capable terminal and other entities, and to collect related information according to which domain selection is performed. The related information includes capability information of the CSI capable terminal, capability information of a packet access network in which the CSI capable terminal lies, correlation information between a CS domain number and a multimedia subsystem domain number of the CSI capable terminal, and attribute information of an ongoing session.

Figure 7:
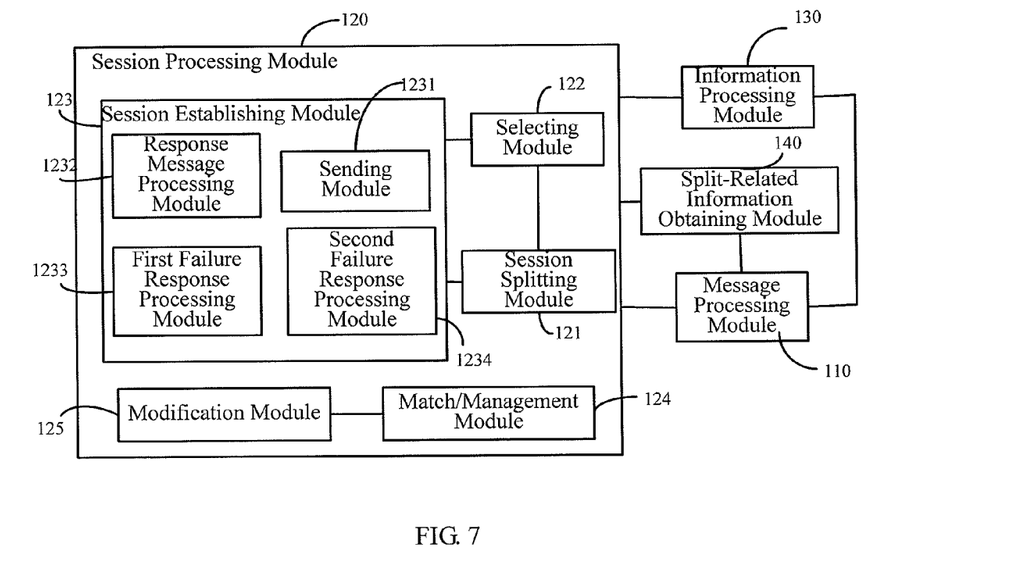
FIG. 7 is a block diagram illustrating the internal structure of the CSI-IW illustrated in FIG. 6.

FIG. 7 is a block diagram illustrating a CSI-IW according to embodiments of the invention.

The CSI-IW includes a message processing module 110, a session processing module 120, and an information processing module 130.

Here, the session processing module 120 includes:

a session splitting module 121 adapted to determine whether the session is needed to be spitted or not according to related information and to split the session when needed;

a selecting module 122 adapted to select a domain for terminating the session according to information on domain selection; and a session establishing module 123 adapted to terminate the session request or the split session in the CS domain or the IMS.

In order to provide related information to the session splitting module 121, the CSI-IW further includes a split-related information obtaining module 140 adapted to obtain and send information for determining whether a session is split or not to the session splitting module 121. The information for determination includes one or any combination of capability information of the access network in which the CSI capable terminal lies, registration status information of the CSI capable terminal in the CS domain, and subscription information of the CSI capable terminal subscriber.

The information on domain selection processed by the information processing module 130 includes one or any combination of capability information of the CSI capable terminal, capability information of a packet access network in which the CSI capable terminal lies, correlation information between a CS domain number and a multimedia subsystem domain number of the CSI capable terminal, registration status information of a subscriber of the CSI capable terminal in the CS domain, attribute information of an ongoing session, and subscription information of the subscriber of the CSI capable terminal.

Here, the session establishing module 123 includes:

a sending module 1231 adapted to send a session request to the CSI capable terminal; and a response message processing module 1232 adapted to process a success response message from the CSI capable terminal and to send the processed message to the IMS terminal.

In specific implementation, for a non-real-time session request, the sending module 1231 sets calling preference information in the non-real-time session request message. The set calling preference information includes one or any combination of "CS video" capability of the CSI capable terminal, "CS voice" capability of the CSI capable terminal, PMI information of the CSI capable terminal, and ServiceID information of the CSI service.

Alternatively, for a non-real-time request, the sending module 1231 uses GRUU information of the IMS of the CSI capable terminal in a non-real-time session request message as the Request URI of the request message.

In addition, the session establishing module 123 further includes a first failure response processing module 1233 and a second failure response processing module 1234.

The first failure response processing module 1233 is adapted to select the IMS of the CSI capable terminal to terminate the real-time session request after a failure response message for terminating the real-time session to the CS domain is received, or to only establish a non-real-time media session between the CSI capable terminal and the IMS terminal.

The second failure response processing module 1234 is adapted to only establish a real-time media session between the CSI capable terminal and the IMS terminal after a failure response message for terminating the non-real-time session to the IMS is received.

The embodiments above of the invention are described by taking a VoIP terminal as an example. However, it is apparent in practice that the method, system and interworking network element according to embodiments of the invention are not merely applicable for the VoIP terminal. Instead, the applicable range may be expanded to other similar IMS terminals, such as an IMS multimedia terminal.

While illustrations and descriptions have been made to the invention by reference to some preferred embodiments of the invention, it should be understood to those skilled in the art that various modifications to those embodiments may be made in terms of forms and details without departing from the spirit and scope of the invention.

What is claimed is:

1. A method for interworking between a Combining CS and IMS services (CSI), capable terminal and an IP Multimedia Subsystem (IMS), terminal, comprising:

receiving an IMS session request initiated by the IMS terminal to the CSI capable terminal;

determining whether an IMS session represented by the IMS session request needs to be split, and splitting the IMS session when needed; and selecting a domain for bearing each of the split IMS sessions according to information on domain selection, and terminating the split IMS sessions in at least one of a Circuit Switched (CS) domain and an IMS, wherein the determining of whether the IMS session and the IMS session represented by the IMS session request is needed to be split or not comprises:

if the IMS session contains a real-time media component and a non-real-time media component, determining whether the IMS session needs to be split or not according to or any combination of capability information of an access network in which the CSI capable terminal lies, registration status information of the CSI capable terminal in the CS domain, and subscription information of a subscriber of the CSI capable terminal.

2. An interworking network element, comprising:

a message processing module adapted to receive and send a message;

a session processing module adapted to perform service logic control and to accomplish establishment of a session between a Combining CS and IMS services (CSI), capable terminal and an IP Multimedia Subsystem (IMS), terminal when the message processing module receives an IMS session request initiated by the IMS terminal to the CSI capable terminal; and an information processing module adapted to obtain information on domain selection, wherein the session processing module comprises:

a session splitting module adapted to determine whether an IMS session represented by the IMS session request needs to be split, and to split the IMS session when needed;

a selecting module adapted to select a domain for bearing each of the split IMS sessions according to information on domain selection;

a session establishing module adapted to establish the split IMS sessions in at least one of a Circuit Switched (CS) domain and an IMS, and a split-related information obtaining module adapted to obtain and send information for determining whether the IMS session is split or not to the session splitting module, and the information for determination comprises one or any combination of capability information of an access network in which the CSI capable terminal lies, registration status information of the CSI capable terminal in the CS domain, and subscription information of a subscriber of the CSI capable terminal.

3. A method for interworking between a CSI capable terminal and an IMS terminal, comprising:

receiving an IMS session request initiated by the IMS terminal to the CSI capable terminal;

determining whether an IMS session represented by the IMS session request needs to be split, and splitting the IMS session when needed; and selecting a domain for bearing each of the split IMS sessions according to information on domain selection, and terminating the split IMS sessions in at least one of a CS domain and an IMS, wherein the information on domain selection comprises one or any combination of capability information of the CSI capable terminal, capability information of a packet access network in which the CSI capable terminal lies, correlation information between a circuit switch domain number and a multimedia subsystem domain number of the CSI capable terminal, registration status information of a subscriber of the CSI capable terminal in the CS domain, attribute information of an ongoing session, and subscription information of the subscriber of the CSI capable terminal.

* * * * *